United States Patent
Ishihara (10) Patent No.: US 9,936,120 B2
(45) Date of Patent: Apr. 3, 2018

(54) IMAGE CAPTURE APPARATUS PERFORMING INTERVAL SHOOTING, IMAGE CAPTURE METHOD AND STORAGE MEDIUM

(71) Applicant: CASIO COMPUTER CO., LTD., Shibuya-ku, Tokyo (JP)

(72) Inventor: Masanori Ishihara, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 246 days.

(21) Appl. No.: 14/588,602

(22) Filed: Jan. 2, 2015

(65) Prior Publication Data
US 2015/0215520 A1    Jul. 30, 2015

(30) Foreign Application Priority Data
Jan. 28, 2014  (JP) ................. 2014-013041

(51) Int. Cl.
*H04N 5/232*      (2006.01)
*G02B 27/28*      (2006.01)

(52) U.S. Cl.
CPC ......... *H04N 5/23212* (2013.01); *G02B 27/28* (2013.01)

(58) Field of Classification Search
CPC .. H04N 5/23212; H04N 5/2356; G03B 13/32; G03B 13/34; G03B 13/36;
(Continued)

(56) References Cited

U.S. PATENT DOCUMENTS 6,763,187 B2    7/2004   Shiraishi
7,598,997 B2*   10/2009  Shiraishi ............ H04N 5/23212
                                                        348/353
(Continued)

FOREIGN PATENT DOCUMENTS

JP    06133202 A     5/1994
JP    2003344891 A   12/2003
(Continued)

OTHER PUBLICATIONS

Japanese Office Action (and English translation thereof) dated Jun. 23, 2015, issued in counterpart Japanese Application No. 2014-013041.
(Continued)

*Primary Examiner* — Lin Ye
*Assistant Examiner* — Chan Nguyen
(74) *Attorney, Agent, or Firm* — Holtz, Holtz & Volek PC (57) ABSTRACT

An image capture apparatus that performs interval shooting to acquire a plurality of captured images photographed with a predetermined photographing interval includes: an image capture unit; an image capture condition determination unit; and an interval shooting processing unit. The image capture unit is configured so as to be able to control focus. The image capture condition determination unit determines a photographing condition of an apparatus. The interval shooting processing unit controls focus of the image capture unit so as to change a focus control method for each photography in the interval shooting according to a photographing condition of the apparatus determined by the image capture condition determination unit.

14 Claims, 5 Drawing Sheets

(58) Field of Classification Search
CPC ... G03B 3/10; G03B 3/12; G02B 7/04; G02B 7/09; G02B 7/10; G02B 7/102; G02B 7/105; G02B 7/28; G02B 7/285; G02B 7/34; G02B 7/343; G02B 7/346; G01C 3/00; G01C 3/30
USPC .......................................................... 348/349
See application file for complete search history.

(56) References Cited

U.S. PATENT DOCUMENTS

| | | | | |
|---|---|---|---|---|
| 8,634,016 | B2 | 1/2014 | Sugimoto | |
| 2004/0091254 | A1* | 5/2004 | Shiraishi | G02B 7/285 396/125 |
| 2005/0088536 | A1* | 4/2005 | Ikeda | G06K 9/00268 348/222.1 |
| 2006/0081760 | A1* | 4/2006 | Kikuchi | G02B 7/08 250/201.5 |
| 2006/0171699 | A1* | 8/2006 | Nakai | H04N 5/23212 396/125 |
| 2007/0052835 | A1 | 3/2007 | Onozawa | |
| 2007/0279365 | A1* | 12/2007 | Kageyama | G02B 7/38 345/100 |
| 2008/0317453 | A1* | 12/2008 | Yuyama | G02B 7/08 396/104 |
| 2010/0208091 | A1* | 8/2010 | Chang | H04N 5/23219 348/222.1 |
| 2011/0019109 | A1* | 1/2011 | Maeda | G03B 21/00 348/745 |
| 2011/0080479 | A1* | 4/2011 | Trumbo | H04N 5/23212 348/143 |
| 2012/0133820 | A1* | 5/2012 | Hsu | H04N 5/23212 348/345 |
| 2012/0155847 | A1* | 6/2012 | Ando | G02B 7/28 396/125 |
| 2012/0320254 | A1* | 12/2012 | Ogino | G02B 7/08 348/345 |
| 2013/0016275 | A1* | 1/2013 | Hokoi | H04N 5/23212 348/345 |
| 2013/0293766 | A1* | 11/2013 | Sugimoto | G02B 7/38 348/345 |
| 2013/0308933 | A1 | 11/2013 | Uchiyama | |
| 2015/0022712 | A1* | 1/2015 | Koishi | G02B 7/28 348/352 |
| 2015/0195448 | A1* | 7/2015 | Endo | H04N 5/23229 348/349 |
| 2015/0215520 | A1* | 7/2015 | Ishihara | G02B 27/28 348/349 |

FOREIGN PATENT DOCUMENTS

| | | |
|---|---|---|
| JP | 2004077517 A | 3/2004 |
| JP | 2004126242 A | 4/2004 |
| JP | 2006005600 A | 1/2006 |
| JP | 2006332746 A | 12/2006 |
| JP | 2007010898 A | 1/2007 |
| JP | 2007074388 A | 3/2007 |
| JP | 2007101578 A | 4/2007 |
| JP | 2007129414 A | 5/2007 |
| JP | 2007219390 A | 8/2007 |
| JP | 2008281701 A | 11/2008 |
| JP | 2009025349 A | 2/2009 |
| JP | 2010014884 A | 1/2010 |
| JP | 2010258616 A | 11/2010 |
| JP | 2011160044 A | 8/2011 |
| JP | 2012163767 A | 8/2012 |
| JP | 2012242427 A | 12/2012 |
| JP | 2013122565 A | 6/2013 |
| JP | 2013242353 A | 12/2013 |
| WO | 2012077435 A1 | 6/2012 |

OTHER PUBLICATIONS

Japanese Office Action (and English translation thereof) dated Dec. 6, 2016 issued in Japanese counterpart Application No. 2016-003487.

* cited by examiner

LENS PROPERTY A (CASE OF NO PROBLEMS IN PROPERTIES)

| PHOTOGRAPHIC SCENE | MODE | FIRST TIME | SECOND TIME AND HIGHER |
|---|---|---|---|
| STANDARD | AF | AF | FIXED (PREVIOUS POSITION) |
| STANDARD | MACRO | AF | FIXED (PREVIOUS POSITION) |
| STANDARD | MF | MF | FIXED (PREVIOUS POSITION) |
| FLOWER | AF | AF | FIXED (PREVIOUS POSITION) |
| FLOWER | MACRO | AF | FIXED (PREVIOUS POSITION) |
| FLOWER | MF | MF | FIXED (PREVIOUS POSITION) |
| STARRY SKY | AF | AF | FIXED (PREVIOUS POSITION) |
| STARRY SKY | MACRO | AF | FIXED (PREVIOUS POSITION) |
| STARRY SKY | MF | MF | FIXED (PREVIOUS POSITION) |

LENS PROPERTY B (CASE OF DEFOCUSING OCCURRING CAUSED BY TEMPERATURE DIFFERENCE, ETC.)

| PHOTOGRAPHIC SCENE | MODE | FIRST TIME | SECOND TIME AND HIGHER |
|---|---|---|---|
| STANDARD | AF | AF | LIMITED AF CONTROL |
| STANDARD | MACRO | AF | LIMITED AF CONTROL |
| STANDARD | MF | MF | LIMITED AF CONTROL |
| FLOWER | AF | AF | LIMITED AF CONTROL |
| FLOWER | MACRO | AF | LIMITED AF CONTROL |
| FLOWER | MF | MF | LIMITED AF CONTROL |
| STARRY SKY | AF | AF | FIXED (PREVIOUS POSITION) |
| STARRY SKY | MACRO | AF | FIXED (PREVIOUS POSITION) |
| STARRY SKY | MF | MF | FIXED (PREVIOUS POSITION) |

PHOTOGRAPHIC SCENE : STANDARD

| MODE | FIRST TIME | SECOND TIME AND HIGHER |
|---|---|---|
| AF | AF | LIMITED AF CONTROL |
| MACRO | AF | LIMITED AF CONTROL |
| MF | MF | LIMITED AF CONTROL |

PHOTOGRAPHIC SCENE : FLOWER

| MODE | FIRST TIME | SECOND TIME AND HIGHER |
|---|---|---|
| AF | AF | LIMITED AF CONTROL |
| MACRO | AF | LIMITED AF CONTROL |
| MF | MF | LIMITED AF CONTROL |

PHOTOGRAPHIC SCENE : STARRY SKY

| MODE | FIRST TIME | SECOND TIME AND HIGHER |
|---|---|---|
| AF | AF | FIXED (PREVIOUS POSITION) |
| MACRO | AF | FIXED (PREVIOUS POSITION) |
| MF | MF | FIXED (PREVIOUS POSITION) |

FIG. 5

IMAGE CAPTURE APPARATUS PERFORMING INTERVAL SHOOTING, IMAGE CAPTURE METHOD AND STORAGE MEDIUM

The present application claims the benefit of the priority of Japanese Patent Application No. 2014-013041, filed in Japan on Jan. 28, 2014, the subject matter of which is hereby incorporated herein by reference.

BACKGROUND OF THE INVENTION

Field of the Invention

The present invention relates to an image capture apparatus, an image capture method, and a storage medium.

Related Art

Conventionally, for photographing lenses, since the refractive index of a lens changes from temperature difference or a barrel holding the lens expands from temperature difference, a photographing condition such as focus will change, a result of which adverse effect occurs in the photographed image, for example, due to defocusing where the focusing position is displaced. Technology for mounting a temperature correction mechanism as in Japanese Unexamined Patent Application No. 2012-242427, for example, has been disclosed as a countermeasure thereto. In particular, for interval shooting (time lapse photography), since the influence due to temperature changes is great, a technology of changing the recording pixel region depending on temperature as in Japanese Unexamined Patent Application No. 2007-129414, for example, has been disclosed as a countermeasure thereto.

SUMMARY OF THE INVENTION

An image capture apparatus according to the first aspect of the present invention is an image capture apparatus that performs interval shooting to acquire a plurality of captured images photographed with a predetermined photographing interval, comprising: an image capture section that can control focus; a condition determination section that determines a photographing condition of the image capture apparatus; and an image capture control section that controls focus of the image capture section so as to change a focus control method for each photography in the interval shooting according to a photographing condition of the image capture apparatus determined by the condition determination section.

An image capture method according to the second aspect of the present invention is an image capture method executed by an image capture apparatus including an image capture section that performs interval shooting to acquire a plurality of captured images photographed with a predetermined photographing interval and can control focus, comprising: condition determination processing that determines a photographing condition of the image capture apparatus; and image capture control processing that controls focus of the image capture section so as to change a focus control method for each photography in the interval shooting according to a photographing condition of the image capture apparatus determined by the condition determination processing.

A computer-readable storage medium according to the third aspect of the present invention is a non-transitory storage medium encoded with a computer-readable program that enables a computer controlling an image capture apparatus including an image capture section that performs interval shooting to acquire a plurality of captured images photographed with a predetermined photographing interval and can control focus, to execute: a condition determination function that determines a photographing condition of the image capture apparatus; and an image capture control function that controls focus of the image capture section so as to change a focus control method for each photography in the interval shooting according to a photographing condition of the image capture apparatus determined by the condition determination function.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The following detailed descriptions of the invention can provide deeper understanding of the present application with reference to the drawings.

DETAILED DESCRIPTION OF THE INVENTION

Embodiments of the present invention are explained below with reference to the drawings.

Figure 1:
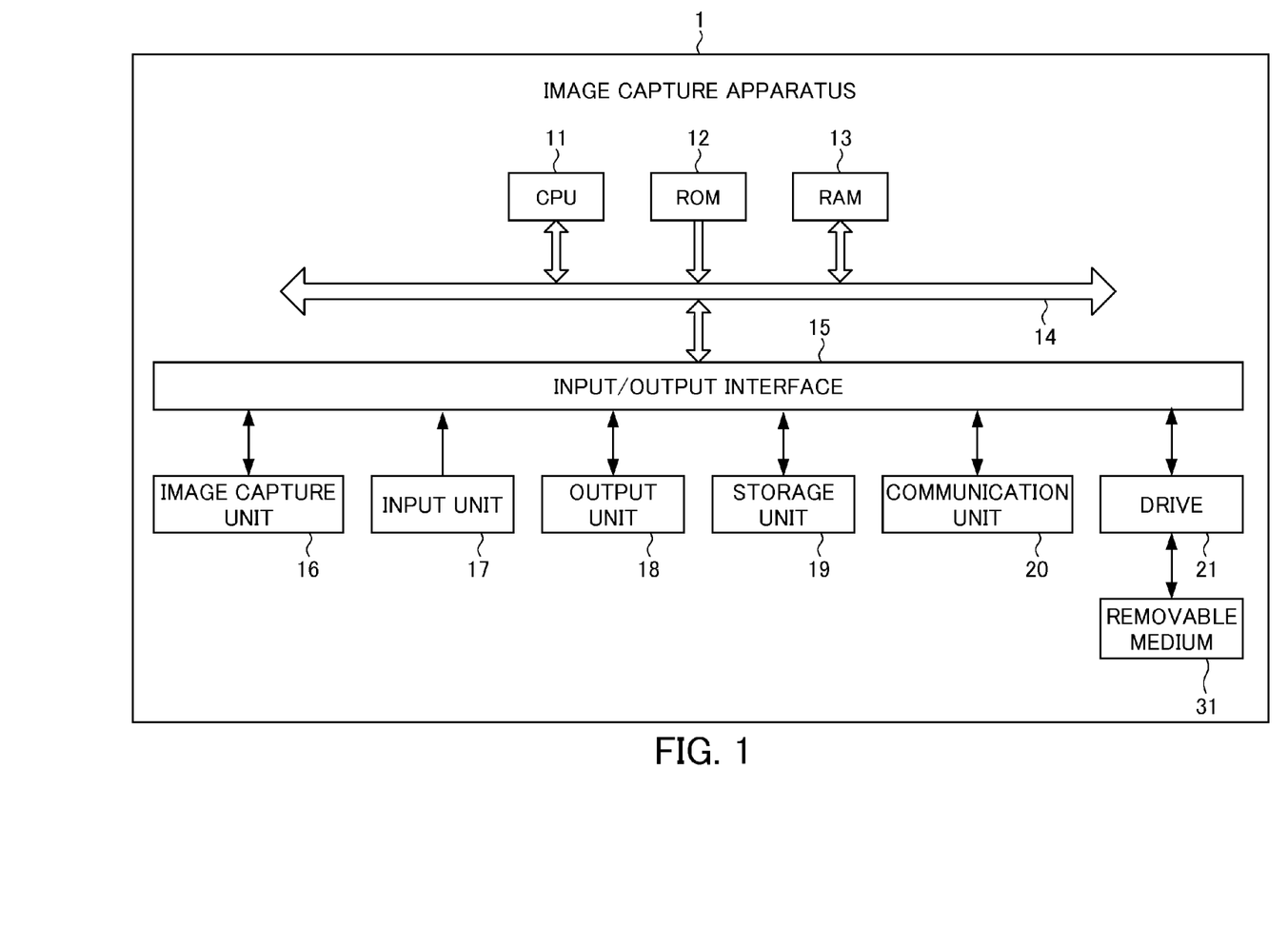
FIG. 1 is a block diagram showing a hardware configuration of an image capture apparatus according to an embodiment of the present invention.

FIG. 1 is a block diagram showing the hardware configuration of an image capture apparatus according to an embodiment of the present invention.

The image capture apparatus 1 is configured as, for example, a digital camera.

The image capture apparatus 1 include a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, an image processing unit (not illustrated), and the like as appropriate.

The input unit 18 is configured by various buttons and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

The image capture apparatus 1 configured in this way has functions of executing photographing processing with a photographing interval that is set and performing interval shooting that acquires a plurality of captured images photographed in a predetermined photographing interval.

Regarding the image capture apparatus according to the present embodiment that performs photography with an imaging optical system such as a lens, the refractive index of the lens changes depending on differences in environment temperature or the temperature of the apparatus or a barrel holding the lens expands depending on differences in environment temperature or the temperature of the apparatus, whereby the focus condition changes. More specifically, when a lens is not retracted and the system is turned on such as for an experiment, the focus condition changes due to the temperature of internal devices such as the LSI (Large Scale Integration) rising. When such a focus condition changes, defocusing may be caused even when focusing to the same position again.

For this reason, the image capture apparatus 1 has, as a function of the interval shooting, a function enabling to perform a focus control appropriately for each interval shooting by additionally considering defocusing caused from lens properties depending on the photographing conditions by way of controlling focusing of the image capture unit 16 according to the photographing conditions (for example, an external environment, an operation status, etc.) during the interval shooting.

Figure 2:
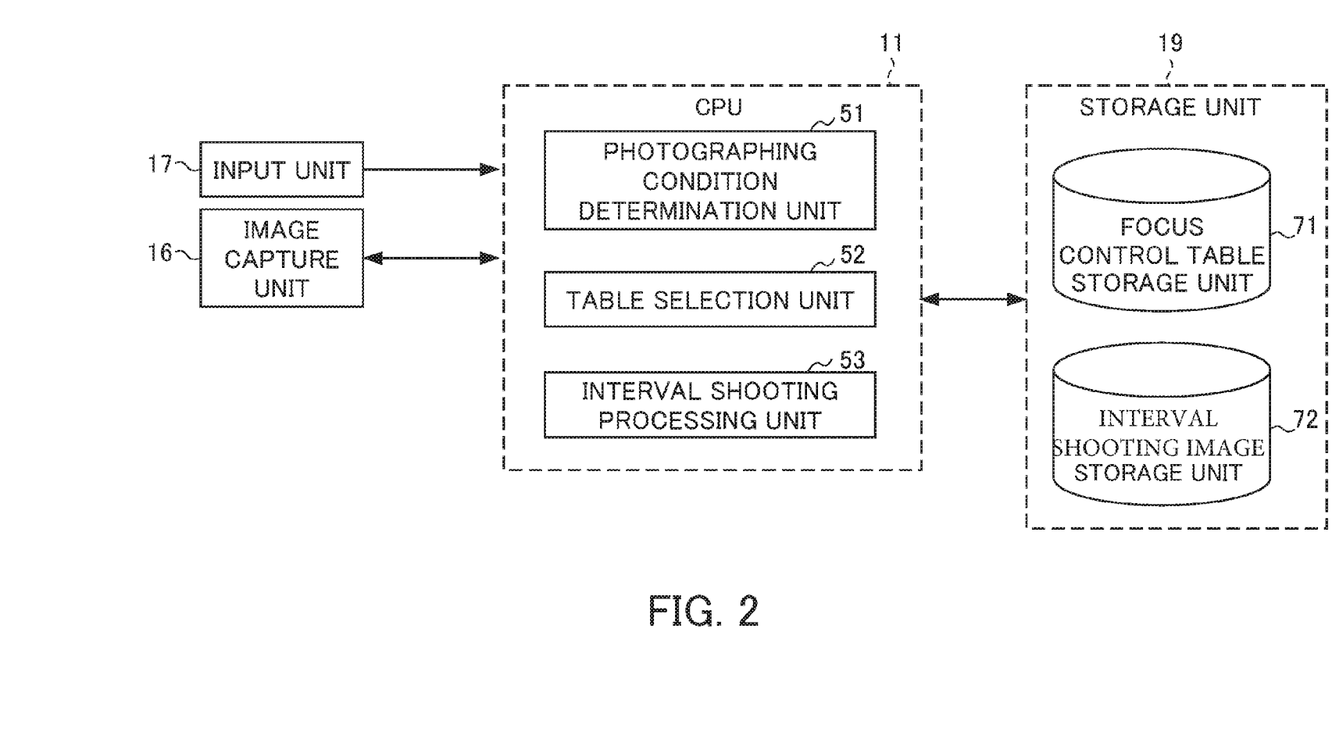
FIG. 2 is a functional block diagram showing a functional configuration for executing interval shooting processing, among the functional configurations of the image capture apparatus of FIG. 1.

FIG. 2 is a functional block diagram showing a functional configuration for executing the interval shooting processing, among the functional configurations of the image capture apparatus 1.

The interval shooting processing according to the present embodiment refers to a sequence of processing that judges the photographing conditions of the apparatus, and performs the interval shooting by performing focusing control according to a photographing conditions thus judged.

As shown in FIG. 2, in the interval shooting processing, a photographing condition determination unit 51, a table selection unit 52, and an interval shooting processing unit 53 function in the CPU 11.

Furthermore, in an area of the storage unit 19, a focus control table storage unit 71 and an interval shooting image storage unit 72 are established.

In the focus control table storage unit 71, a table in which photographing conditions of the apparatus are associated with focusing control (hereinafter, referred to as "focus control table") is stored.

Figure 3:
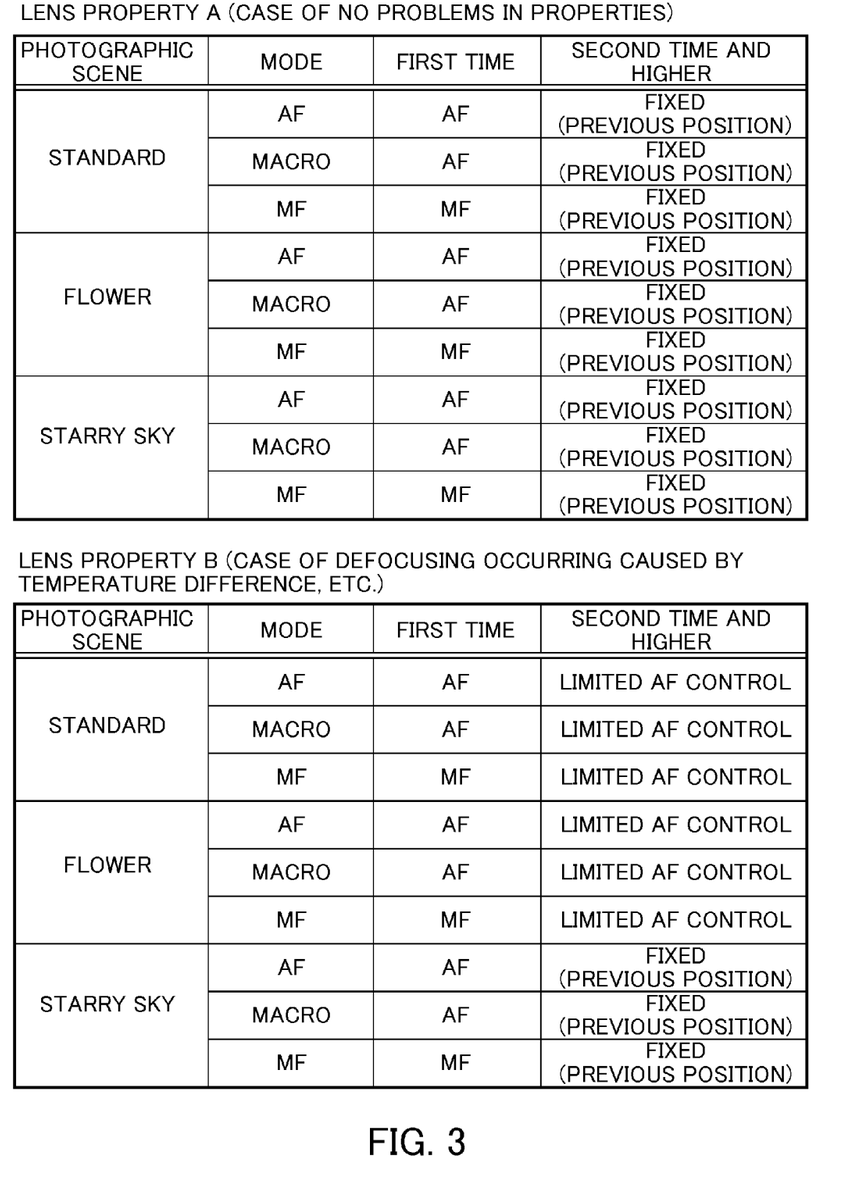
FIG. 3 is a view illustrating a focus control table.

FIG. 3 is a view illustrating a focus control table.

As shown in FIG. 3, the focus control table constitutes different tables depending on lenses used.

In the present embodiment, there is a focus control table for a lens property A, which does not raise any particular problems in properties whereby defocusing is not likely to occur due to temperature differences, etc., and a focus control table for a lens property B with which defocusing is occurs due to temperature difference. Lenses for which defocusing occurs include, for example, a lens made of ED (Extra-low Dispersion) glass. With a lens made of ED glass, since the focal distance of a positive ED lens extends drastically along with a temperature increase, great defocusing is caused upon temperature fluctuation.

In each focus control table, photographic scenes are associated with photographic parameters.

The "photographic scene" includes "standard", "flower" for photographing a flower, and "starry sky" for photographing a starry sky.

It should be noted that the cases of "standard" and "flower" have a shorter photographing interval. Therefore, collapsing of the lens of the imaging unit is not performed until a subsequent photography after performing photography. On the other hand, the case of "starry sky" has a longer photographing interval. Therefore, collapsing of the lens of the imaging unit is performed until a subsequent photography after performing photography.

"Mode" refers to a mode for setting focus control and includes "AF", which is auto focus, "MACRO", which is auto focus for macro photography, and "MF", which is manual focus for a first time photographing. It is configured so that a user can choose each mode arbitrarily.

"First time" refers to a mode fixed for focus control for the first time (initial) photography. "AF" and "MACRO" are the "AF" mode and "MF" is the "MF" mode.

"Second time and higher" refers to a mode fixed for focus control for second time and higher photography.

In the present embodiment, focus control for "second time and higher" differs depending on the differences in lens properties.

More specifically, in the focus control table for the lens property A, since there is no problem in the lens properties, "second time and higher" is fixed to a previous position ("fixed (previous position)") for all "modes" for each photographic scene.

On the other hand, in the focus control table for the lens property B having properties whereby defocusing occurs due to temperature difference, etc., in the case of photographic scenes having a shorter photographing interval for which a lens is not collapsed, a limited AF control is performed.

The "limited AF control" refers to focus control that limits the movable range of the lens and performs AF again. The purpose of performing AF control again is to correct defocusing. Therefore, it is possible to achieve speeding-up and power savings by performing the AF control within a range not greatly deviating from a previous focus position with the previous focus position as a starting point. In the case of the present embodiment, if there is a photographing interval that is approximately at least 1 minute, for example, it is possible to turn off the system and collapse the lens. Therefore, in a case of a photographic scene satisfying the condition, the limited AF control is performed.

More specifically, in the focus control table for the lens property B, "second time and higher" in the case of "standard" and "flower" which are scenes with a shorter photographing interval for which the system is not turned off and the lens is not collapsed, "limited AF control" is performed.

In addition, in a case in which the photographing interval is longer, the system is turned off, and the lens is collapsed, the apparatus no longer operates since the lens is collapsed, a result of which each part cools down and the influence of temperature on the lens is small; therefore, it is set to "fixed (previous position)". However, in a case in which there exists a factor of increasing the lens temperature such as high environmental temperature, it may be configured so as to detect the factor and perform "limited AF control".

In addition, although it is explained as if, for the above-mentioned focus control tables, the lens property tables A and B have different tables, respectively, for the purpose of illustration, since the present embodiment is a digital camera provided with a lens having the lens property B, the present embodiment only has the focus control table of the lens property B. In other words, it is configured so that only the focus control table of the lens property B is stored in the focus control table storage unit 71.

With reference to FIG. 2 again, data of captured images acquired by the interval shooting is stored in the interval shooting image storage unit 72.

The photographing condition determination unit 51 determines a condition around the apparatus and a condition of a subject.

Furthermore, the photographing condition determination unit 51 determines the condition of the apparatus itself and a condition in which the apparatus is located including the state of the environment outside the apparatus (hereinafter, referred to as "photographing condition"). More specifically, the photographing condition determination unit 51 determines a photographing condition of the apparatus (specifically, ambient temperature of LSI or an apparatus, etc.).

The table selection unit 52 selects a focus control table corresponding to a photographic scene based on a lens to be used and a determination result from the photographing condition determination unit 51.

In the present embodiment, since the table selection unit 52 uses a lens of the lens property B, in a case in which the photographing condition determination unit 51 determines that a determination result is "flower", for example, as shown in FIG. 3, the table selection unit 52 selects a focus control table of "photographic scene: flower" of the lens property B.

The interval shooting processing unit 53 controls the image capture unit 16 so as to perform photography corresponding to a photographic scene based on the focus control table selected by the table selection unit 52.

For example, in a case of performing photography with "focus mode: AF" of "photographic scene: flower" of the lens property B, the interval shooting processing unit 53 performs photography with a certain number of photographs and a photographing interval set in advance based on the focus control table shown in FIG. 3. Furthermore, the image capture unit 16 is controlled such that, for the first time photographing, AF control is performed for focusing and, for a second time and higher, the limited AF control is performed for focusing.

Furthermore, the interval shooting processing unit 53 allows an interval shooting image that is captured to be stored in the interval shooting image storage unit 72.

Figure 4:
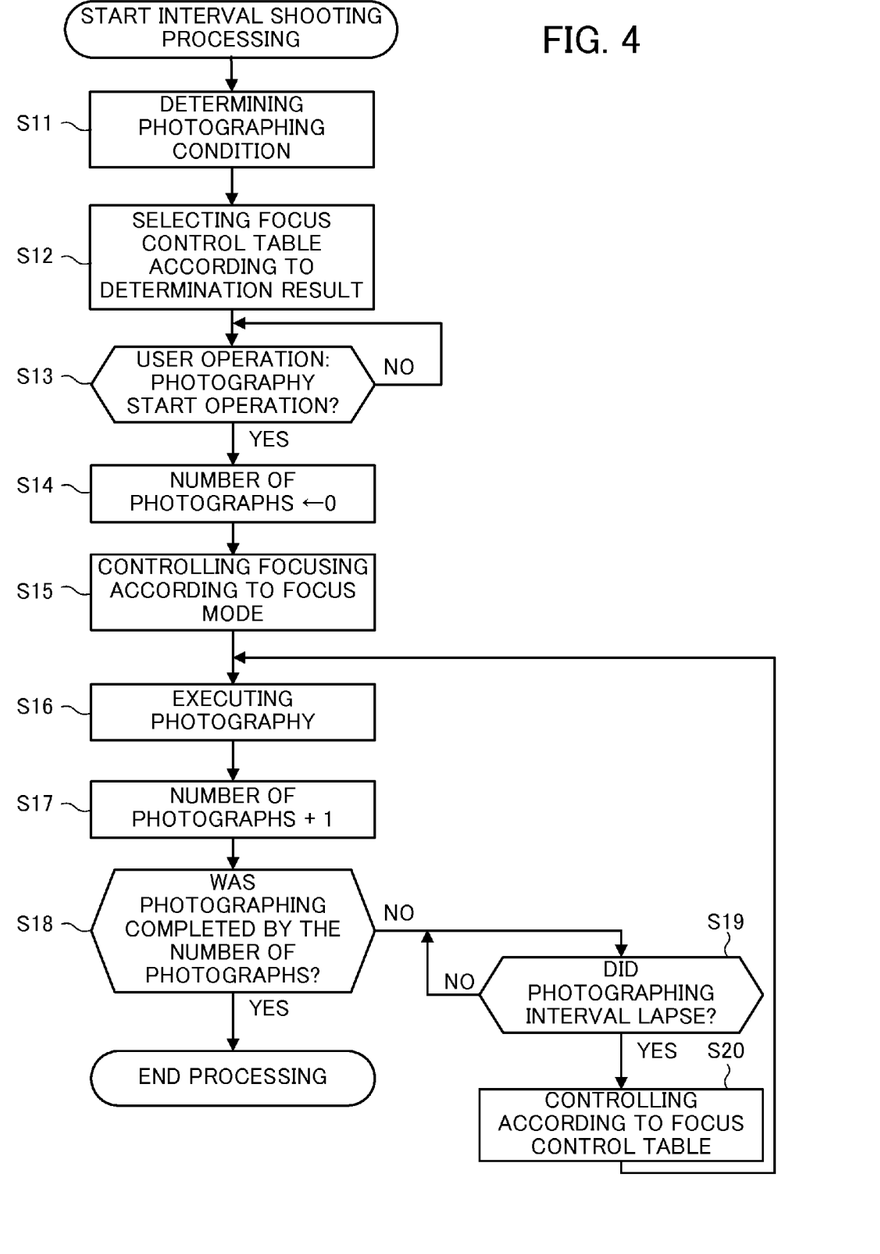
FIG. 4 is a flowchart illustrating a flow of interval shooting processing executed by the image capture apparatus of FIG. 1 having the functional configuration of FIG. 2.

FIG. 4 is a flowchart illustrating a flow of the interval shooting processing executed by the image capture apparatus 1 of FIG. 1 having the functional configurations of FIG. 2.

The interval shooting processing starts with an operation of starting the interval shooting processing on the input unit 17 by a user.

In Step S11, the photographing condition determination unit 51 determines a photographing condition.

In Step S12, the table selection unit 52 selects a focus control table stored in the focus control table storage unit 71 according to a determination result from the photographing condition determination unit 51. More specifically, the table selection unit 52 selects a photographic scene and a mode from the focus control table of the lens property B shown in FIG. 3.

In Step S13, the interval shooting processing unit 53 determines whether there is a photography start operation via the input unit 17 by a user.

In a case in which there is no photography start operation, it is determined as NO in Step S13, and it enters a standby state until there is an photography start operation.

In a case in which there is an photography start operation, it is determined as YES in Step S13, and the processing advances to Step S14.

In Step S14, the interval shooting processing unit 53 sets the number of photographs to zero for a subsequent interval shooting.

In Step S15, the interval shooting processing unit 53 controls the image capture unit 16 to set focusing according to a focus mode based on the focus control table selected by the table selection unit 52. More specifically, the interval shooting processing unit 53 controls the image capture unit 16 with the setting of "first time" based on a photographic scene and a mode from the focus control table of the lens property B shown in FIG. 3. In a case of "mode: AF" with "photographic scene: flower", the image capture unit 16 is controlled so as to be in the setting of "first time: AF".

In Step S16, the interval shooting processing unit 53 executes photography. Thereafter, interval shooting images outputted from the image capture unit 16 are stored in the interval shooting image storage unit 72.

In Step S17, the interval shooting processing unit 53 counts the number of photographs by incrementing by one.

In Step S18, the interval shooting processing unit 53 determines whether photographing was completed by the number of photographs.

In a case in which photographing was completed by the number of photographs, it is determined as YES in Step S18, and the interval shooting processing ends.

In a case in which photographing was not completed by the number of photographs, it is determined as NO in Step S18, and the processing advances to Step S19.

In Step S19, the interval shooting processing unit 53 determines whether a photographing interval lapses.

In a case in which the photographing interval does not lapse, it is determined as NO in Step S19 and it enters a standby state until the photographing interval lapses.

In a case in which the photographing interval lapsed, it is determined as YES in Step S19, and the processing advances to Step S20.

In Step S20, due to being second time and higher photography, the interval shooting processing unit 53 controls the image capture unit 16 to set focusing according to a focus mode based on the focus control table selected by the table selection unit 52. More specifically, the interval shooting processing unit 53 controls the image capture unit 16 with the setting of "second time" based on a photographic scene and a mode from the focus control table of the lens property B shown in FIG. 3. In a case of "mode: AF" with "photographic scene: flower", the image capture unit 16 is controlled so as to be in the setting of "second time: limited AF control".

Thereafter, the processing returns to Step S16 and photographing is executed again.

Modified Embodiment

In the abovementioned embodiment, an example of setting different focus controls according to photographic scenes is explained in consideration of the lens property for which defocusing occurs caused by a temperature difference, etc.

Figure 5:
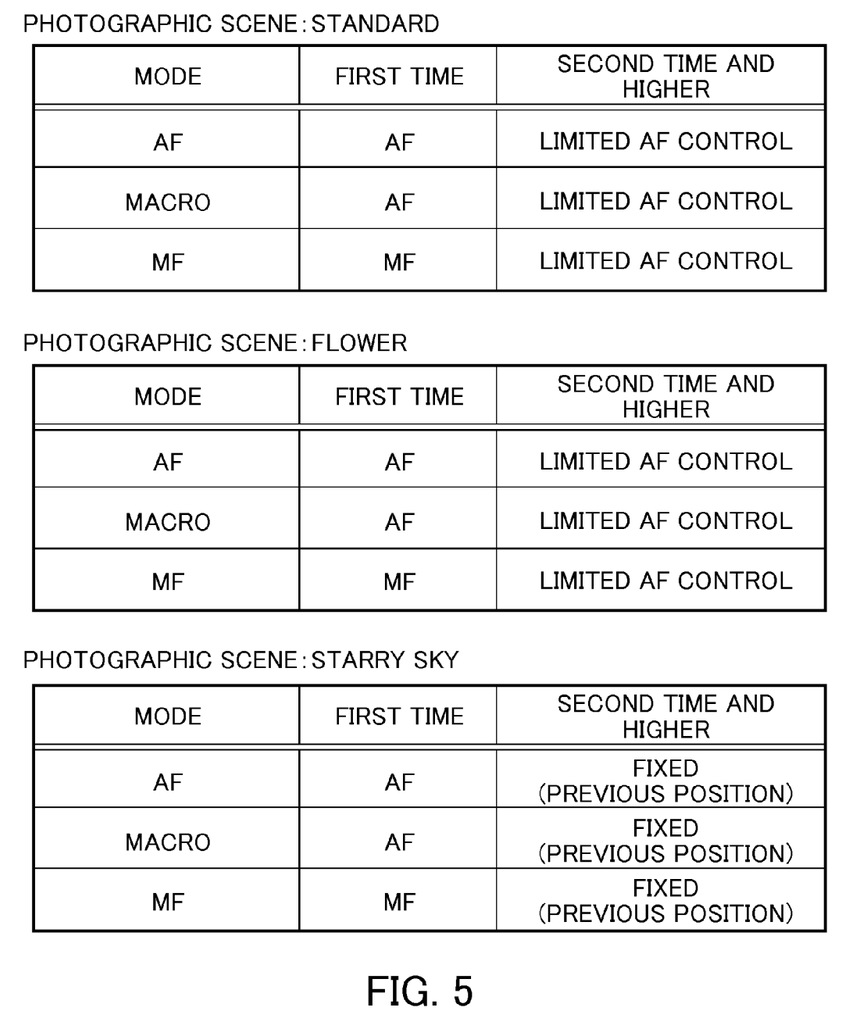
FIG. 5 is a view illustrating another focus control table.

In the present embodiment, an example of setting different focus controls according to photographic scenes is explained. FIG. 5 is a view illustrating another focus control table.

As shown in FIG. 5, the focus control table of the present embodiment is provided for each photographic scene.

Since "photographic scene: standard" has a shorter interval distance and the lens is not collapsed, it is configured so as to perform the limited AF control for "second time and higher". Furthermore, since "photographic scene: flower" also has a shorter photographic interval and the lens is not collapsed, it is configured so as to perform the limited AF control for "second time and higher".

On the other hand, since "photographic scene: starry sky" has a longer photographic interval and the lens is collapsed, it is configured so as to set fixed (previous position) for "second time and higher".

For this reason, with the image capture apparatus 1, for such a scene for which the photographic interval is shorter and the apparatus continues to operate even in a non-photographing period, since defocusing may be caused in the first time and second time and higher, it is possible to set focusing to a position similar to the position for the first time by performing the limited AF control to limit a movable range of the lens and performing AF again.

The image capture apparatus 1 configured in the above way includes the image capture unit 16, the photographing condition determination unit 51, and the interval shooting processing unit 53. Furthermore, the image capture apparatus 1 performs interval shooting that acquires a plurality of captured images photographed with a predetermined photographing interval.

The image capture unit 16 is configured so as to be able to control focusing.

The photographing condition determination unit 51 determines a photographing condition of an apparatus including, an external environment, a condition of the apparatus, a state of a photographing subject, etc.

The interval shooting processing unit 53 controls focusing of the image capture unit 16 at the time of interval shooting according to a photographing condition of the apparatus determined by the photographing condition determination unit 51.

With the image capture apparatus 1, it is thereby possible to perform focus control appropriately so as to change a focus control method for each shooting in the interval shooting since focus of the image capture unit 16 at the time of the interval shooting is controlled according to a photographing condition of the apparatus.

The interval shooting processing unit 53 controls to change the focus control method of the image capture unit 16 at the time of the interval photographing for second time and higher photography, according to the photographing condition of the apparatus determined by the photographing condition determination unit 51.

With such a configuration, in the image capture apparatus 1, it is possible to perform focus control at the time of the interval shooting appropriately.

The interval shooting processing unit 53 controls to change the focus control method of the image capture unit 16 at the time of photographing for a second time and higher, based on focus of the image capture unit 16 at the time of the interval shooting for the first time.

With the image capture apparatus 1, since the focus is changed according to the first time, it is thereby possible to perform appropriate focus control.

At the time of the second time and higher photography, the interval shooting processing unit 53 controls the image capture unit 16 to change a focus position newly with a focus position for the first time as a starting point.

With the image capture apparatus 1, since the change of focus is performed according to the first time, it is thereby possible to perform appropriate focus control.

The interval photographing processing unit 53 controls the image capture unit 16 so as to newly change a focus position within a predetermined range with the focus position for the first time as a starting point.

With the image capture apparatus 1, since the change of focus is performed according to the first time, it is thereby possible to perform appropriate focus control.

The photographing condition determination unit 51 determines a photographing condition of the apparatus according to a lens property related to defocusing.

With the image capture apparatus 1, since it is possible to perform focus control in consideration of defocusing caused due to a lens property, it is thereby possible to perform the focus control at the time of the interval shooting appropriately.

The photographing condition determination unit 51 determines a photographing condition of the apparatus according to a photographic scene that is set arbitrarily.

With the image capture apparatus 1, since it is thereby possible to perform focus control according to a photographic scene, it is possible to perform the focus control at the time of the interval shooting appropriately.

The photographing condition determination unit 51 determines a photographing condition of an apparatus according to a focus mode including auto focus or manual focus that is set arbitrarily.

With the image capture apparatus 1, since it is thereby possible to perform focus control according to a focus mode, it is possible to perform the focus control at the time of the interval shooting appropriately.

The photographing condition determination unit 51 determines a photographing condition of the apparatus according to a photographing interval of the interval shooting that is arbitrarily set.

With the image capture apparatus 1, since it is thereby possible to perform focus control according to the photographing interval, it is possible to perform the focus control at the time of the interval shooting appropriately.

The photographing condition determination unit 51 determines a photographing condition according to apparatus temperature or environmental temperature.

With the image capture apparatus 1, since it is thereby possible to perform focus control according to the apparatus temperature or environmental temperature, it is possible to perform the focus control at the time of the interval shooting.

Furthermore, the image capture apparatus 1 includes the focus control table storage unit 71 and the table selection unit 52.

The focus control table storage unit 71 stores a plurality of tables associating settings of focus of the image capture unit 16 according to a photographing condition at the time of the interval shooting.

The table selection unit 52 selects a table according to a photographing condition of the apparatus from among the plurality of tables stored in the focus control table storage unit 71 based on a determination result from the photographing condition determination unit 51.

The interval shooting processing unit 53 controls focus of the image capture unit 16 based on a table selected by the table selection unit 52.

With the image capture apparatus 1, since focus control is performed based on the table, it is thereby possible to perform focus control at the time of the interval shooting appropriately in a simpler manner with less processing load.

It should be noted that the present invention is not to be limited to the aforementioned embodiment, and that modifications, improvements, etc. within a scope that can achieve the objects of the present invention are also included in the present invention.

In the abovementioned embodiment, although it is configured so as to perform focus control (the limited AF control) to avoid defocusing of the lens by way of the photographic mode regardless of the photographing interval, it may be configured so as to perform the focus control (the limited AF control) that avoids defocusing of the lens in a case in which the photographing interval is set longer, the system is turned off, and the lens is collapsed.

Furthermore, in the abovementioned embodiment, although the digital camera provided with the lens of the lens property B in a fixed manner is employed, and only the focus control table of the lens property B is possessed, it may be configured so that the focus control table of the lens property A is possessed when a lens provided has the lens property A.

Furthermore, in the abovementioned embodiment, it is premised that the lens is not interchanged. However, in a case in which the lens can be interchanged, it may be configured so that focus control tables according to a plurality of lens properties are possessed in the focus control table storage unit 71 and the table selection unit 52 selects a table according to a lens mounted.

Furthermore, in the abovementioned embodiment, although the focus for the second time and higher photography is controlled according to the focus for the first time photography, in a case of performing the limited AF for the focus for the second time and higher, it may be configured so as to perform the limited AF according to focus at the time of a previous photography for each photography, for example, performing the limited AF according to the focus for the second time at the time of the third time photography and performing the limited AF according to the focus for the third time at the time of the fourth time photography, a result of which focus with more accuracy can be achieved.

Furthermore, in the abovementioned embodiment, although it is configured to avoid defocusing according to whether the system is turned on or off and whether the lens is collapsed or not in consideration of defocusing of the lens caused by environmental temperature and temperature inside an apparatus, since the defocusing of the lens may also occur in such a case of the posture of the apparatus that gravity is applied in an adjustment direction of the lens (in an upward direction, in a downward direction, etc.), it may be configured so as to perform focus control (the limited AF control) that avoids defocusing according to the posture of the apparatus.

More specifically, it is possible to configure such that the photographing condition determination unit 51 determines a photographing condition according to the posture of the apparatus.

Moreover, in the abovementioned embodiment, although the focus control tables are configured from the aspects of the lens properties, the photographic scenes, etc., the present invention is not limited thereto, and it is configured so as to employ a plurality of focus control tables from the aspects of, for example, photographic mode, photographing interval, temperature, posture of apparatus, and the like. In this case, it is configured to select a focus control table from among the abovementioned aspects according to a photographing condition.

In the aforementioned embodiments, the digital camera has been described as an example of the image capture apparatus 1 to which the present invention is applied, but the present invention is not limited thereto in particular.

For example, the present invention can be applied to any electronic device in general having an interval shooting processing function. More specifically, for example, the present invention can be applied to a lap-top personal computer, a printer, a television, a video camera, a portable navigation device, a smart phone, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. An image capture apparatus that performs interval shooting to acquire a plurality of captured images photographed with a predetermined photographing interval, the apparatus comprising:
    an image capture unit including a lens and an image sensor;
    a memory that stores a plurality of tables associating, according to whether the image capture unit has a type of lens which is likely to experience defocusing, settings of focus of the image capture unit for the interval shooting; and
    a processor and a memory storing a program that is executable by the processor to perform operations comprising:
        determining whether the image capture unit has a type of lens which is likely to experience defocusing during the interval shooting;
        before starting the interval shooting, selecting a table from among the plurality of tables stored in the memory, based on a result of the determining whether the image capture unit has a type of lens which is likely to experience defocusing during the interval shooting; and
        according to the result of the determining, controlling focusing of the image capture unit for each photographing during the interval shooting based on the selected table, the selected table including settings of focus for changing a focus control method during the interval shooting in a case in which it is determined that the image capture unit has a type of lens which is likely to experience defocusing during the interval shooting.

2. The image capture apparatus according to claim 1, wherein changing the focus control method comprises changing a range in which a focus position is adjustable.

3. The image capture apparatus according to claim 2, wherein changing the focus control method comprises changing the focus control method for second and subsequent instances of photography in the interval shooting.

4. The image capture apparatus according to claim 3, wherein the focus control method for the second and subsequent instances of photography is based on focusing of the image capture unit at a time of a first instance of photography in the interval shooting.

5. The image capture apparatus according to claim 3, wherein, for each of the second and subsequent instances of photography, the processor controls the image capture unit to newly set a focus position with a focus position for a first instance of photography in the interval shooting as a starting point.

6. The image capture apparatus according to claim 5, wherein, for each of the second and subsequent instances of photography, the processor controls the image capture unit so as to newly set the focus position within a predetermined range with the focus position for the first instance of photography as the starting point.

7. The image capture apparatus according to claim 1, wherein the controlling focusing comprises:
    in a case in which it is determined that the image capture unit does not have a type of lens which is likely to experience defocusing during the interval shooting, setting a focus position for second and subsequent instances of photography in the interval shooting to a same position as a focus position for a first instance of photography in the interval shooting;
    wherein in the case in which it is determined that the image capture unit has a type of lens which is likely to experience defocusing during the interval shooting, the processor controls the image capture unit to newly set the focus position for the second and subsequent instances of photography with the focus position for the first instance of photography as a starting point.

8. The image capture apparatus according to claim 1, wherein the controlling focusing is performed based on a further determination of whether defocusing is likely to occur that is made based on a photographic scene that is arbitrarily set according to a subject to be photographed.

9. The image capture apparatus according to claim 1, wherein the controlling focusing is performed according to a focus mode including auto focus or manual focus that is set arbitrarily.

10. The image capture apparatus according to claim 1, wherein the controlling focusing is performed based on a further determination of whether defocusing is likely to occur that is made based on a photographing interval of the interval shooting that is arbitrarily set.

11. The image capture apparatus according to claim 1, wherein the processor determines whether the image capture unit has a type of lens which is likely to experience defocusing caused by temperature.

12. The image capture apparatus according to claim 1, wherein the operations further comprise:
- before starting the interval shooting, deciding a focus control method for each photographing during the interval shooting based on the selected table; and
- controlling focusing of the image capture unit for each photographing during the interval shooting based on a result of the deciding.

13. An image capture method executed by an image capture apparatus, the image capture apparatus comprising an image capture unit including a lens and an image sensor, the image capture apparatus being configured to perform interval shooting to acquire a plurality of captured images photographed with a predetermined photographing interval, and the image capture apparatus further comprising a memory that stores a plurality of tables associating, according to whether the image capture unit has a type of lens which is likely to experience defocusing, settings of focus of the image capture unit for the interval shooting, the method comprising:
- determining whether the image capture unit has a type of lens which is likely to experience defocusing during the interval shooting;
- before starting the interval shooting, selecting a table from among the plurality of tables stored in the memory, based on a result of the determining whether the image capture unit has a type of lens which is likely to experience defocusing during the interval shooting; and
- according to the result of the determining, controlling focusing of the image capture unit for each photographing during the interval shooting based on the selected table, the selected table including settings of focus for changing a focus control method during the interval shooting in a case in which it is determined that the image capture unit has a type of lens which is likely to experience defocusing during the interval shooting.

14. A non-transitory storage medium storing a computer-readable program that is executable by a processor of an image capture apparatus, the image capture apparatus comprising an image capture unit including a lens and an image sensor, the image capture apparatus being configured to perform interval shooting to acquire a plurality of captured images photographed with a predetermined photographing interval, and the image capture apparatus further comprising a memory that stores a plurality of tables associating, according to whether the image capture unit has a type of lens which is likely to experience defocusing, settings of focus of the image capture unit for the interval shooting, the program being executable by the processor to perform operations including:
- determining whether the image capture unit has a type of lens which is likely to experience defocusing during the interval shooting;
- before starting the interval shooting, selecting a table from among the plurality of tables stored in the memory, based on a result of the determining whether the image capture unit has a type of lens which is likely to experience defocusing during the interval shooting; and
- according to the result of the determining, controlling focusing of the image capture for each photographing during the interval shooting based on the selected table, the selected table including settings of focus for changing a focus control method during the interval shooting in a case in which it is determined that the image capture unit has a type of lens which is likely to experience defocusing during the interval shooting.

* * * * *